(No Model.) 2 Sheets—Sheet 1.

C. H. FUCHS.
MACHINE FOR TONGUING AND CUTTING BOX BOTTOMS.

No. 469,059. Patented Feb. 16, 1892.

Witnesses
A. L. Hobbs
P. M. Hulbert

Inventor
Charles H. Fuchs
By Thos. S. Sprague & Son
Att'ys.

(No Model.) 2 Sheets—Sheet 2.
C. H. FUCHS.
MACHINE FOR TONGUING AND CUTTING BOX BOTTOMS.
No. 469,059. Patented Feb. 16, 1892.
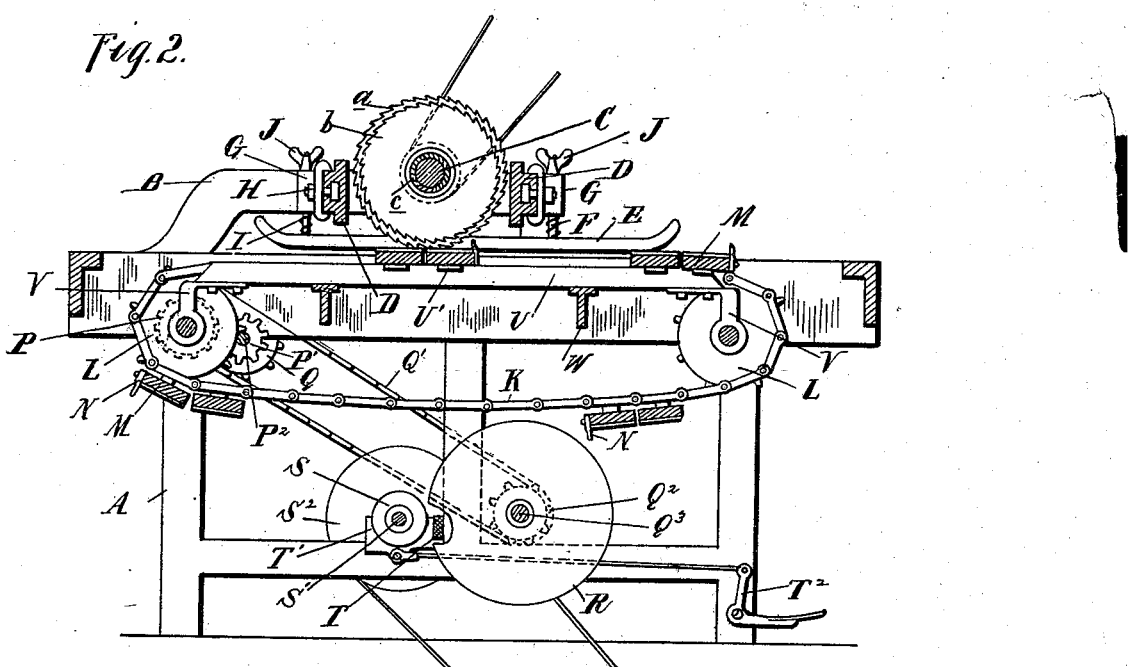
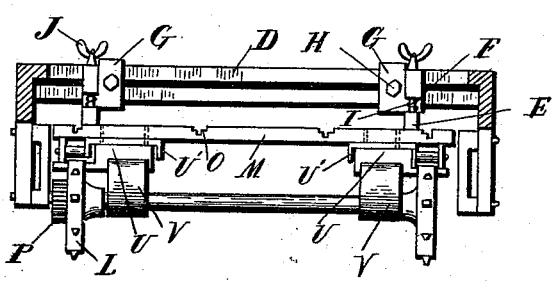
Witnesses
Inventor
Charles H. Fuchs
By Thos. S. Sprague & Son
Att'ys.

UNITED STATES PATENT OFFICE.

CHARLES H. FUCHS, OF TIFFIN, OHIO.

MACHINE FOR TONGUING AND CUTTING BOX-BOTTOMS.

SPECIFICATION forming part of Letters Patent No. 469,059, dated February 16, 1892.

Application filed February 11, 1891. Renewed January 9, 1892. Serial No. 417,461. (No model.)

*To all whom it may concern:*

Be it known that I, CHARLES H. FUCHS, a citizen of the United States, residing at Tiffin, in the county of Seneca and State of Ohio, have invented certain new and useful Improvements in Machines for Tonguing and Cutting Box-Bottoms, of which the following is a specification, reference being had therein to the accompanying drawings.

This invention relates to new and useful improvements in a machine for tonguing and cutting box-bottoms; and it consists in the peculiar construction of the various parts whereby a series of box-bottoms is cut from a single board or strip and the tongues or notches formed in the edges of the board simultaneously with the cutting off, and, further, in the peculiar construction, arrangement, and combination of the various parts, all as more fully described hereinafter.

Figure 1:
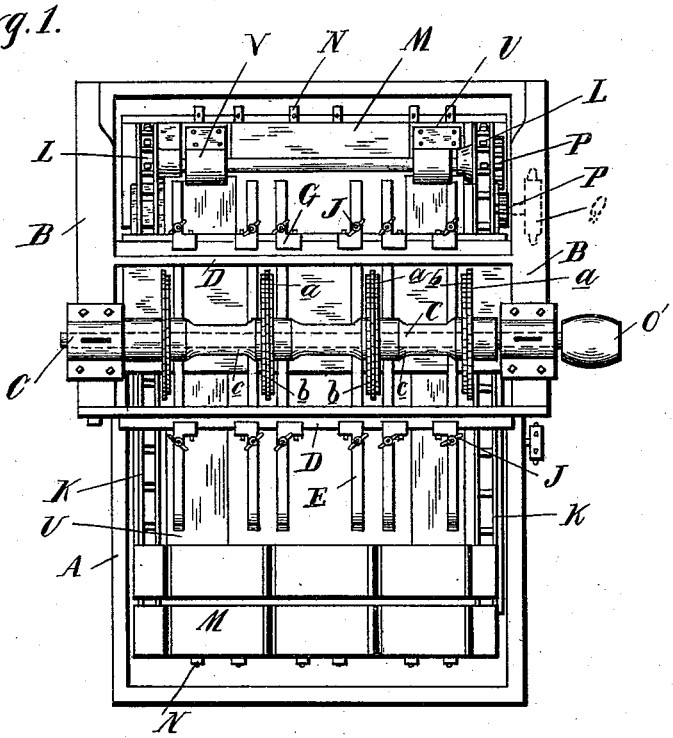
Figure 4:
Figure 5:

In the drawings, Figure 1 is a plan view of my improved machine. Fig. 2 is a vertical central section thereof. Fig. 3 is an end elevation thereof, partly in section. Fig. 4 is a plan view of the blank, and Fig. 5 is an edge elevation showing the blank cut as it leaves the machine.

A is the frame of the machine, of any suitable construction, which at the top is provided with saw-supporting side frames B, on which is journaled in suitable boxes the saw-arbor C. This arbor carries a series of cutters. In the drawings herewith I have shown a series of four—each of the inner series consisting of three saws—a central saw $a$ and two outer saws $b$—the central saw being of greater diameter than the outer saws. The end cutters consist of the saw $a$ and a single saw $b$. These cutters are separated by means of suitable thimbles $c$, which fit upon the arbor and are detachable, whereby thimbles of different length may be inserted to differently space the series of cutters. The two side frames are connected upon either side of the saw by the cross-bar D, which carry pressure-bars E, suspended from the lower ends of the rods F, which engage through suitable vertical apertures into the heads G, adjustingly secured by means of the bolt H to the bars D.

I are springs interposed between the pressure-bars and the heads, and J are winged nuts for adjusting the tension of the spring and the height of the pressure-bar.

The bolts H have suitable heads which engage in the slot in the bar D, as plainly shown in Fig. 2. By this construction I am enabled to arrange the pressure-bars in proper relation to the saws in any of their adjusted positions.

K is an endless feed-carrier preferably made in the form of two sprocket-chains engaging with the sprocket-wheels L at either end of the frame and carrying suitable feed-tables M, which connect the chains upon opposite sides of the carrier. These feed-tables are preferably made in sections of width corresponding to the length of the links, so that they may be readily carried along by the chains, and are provided at their rear ends with suitable abutments N to hold the work in position and with suitable grooves O corresponding with the grooves to be made by the saws.

Motion is transmitted to the saw-arbor through the pulley O' from any suitable source and to the carrier by means of a gear-wheel P, connected to one of the sprocket-wheels L or to the shaft upon which this sprocket-wheel is secured. This gear-wheel meshes with the gear-pinion P' upon the shaft $P^2$, upon which is also secured the sprocket-wheel Q, driven by the sprocket-chain Q', which passes over the sprocket-wheel $Q^2$, secured upon the shaft $Q^3$ in the lower part of the frame. This shaft $Q^3$ carries the friction-pulley R, which engages with the friction-pulley S upon the counter-shaft S', which also carries the pulley $S^2$, driven from any suitable source of power. The pulley S is normally held out of contact with the pulley R by means of a spring-bearing T, preferably a rubber cushion, and it is thrown into contact therewith by means of the bell-crank lever $T^2$, adapted to be moved by the operator's foot and connected to the box T', which carries the shaft S' and is held in suitable sliding bearings. The parts being thus constructed, if a blank of suitable length is placed upon one of the carrier-tables M, with its rear edges bearing against the abutment N and motion being transmitted to the carrier through the connections described, it is fed beneath the pressure-bars E to the cutters, where the side saws $b$ form the grooves at the edges, while the saws a, being of sufficiently larger diameter, cut entirely through the blank in the center of the groove, the end saws trimming the ends of the blank to the proper length and forming the groove in the edge thereof, as plainly shown in Fig. 5. Thus in a single operation a blank is transformed into a number of box-bottoms of proper size and with the tongues formed thereon.

The saws, as previously described, may be adjusted to any width of bottom and the pressure-bars correspondingly adjusted, so as to bear upon the work in proximity to the saws. The work-carrying tables M are guided beneath the saws and carried in a horizontal plane by resting upon the longitudinal supporting-bars U, and suitable flanged plates U' are secured upon the under side of the tables M to slidingly engage with the top of the bars U, which bars are supported on cross-bars W.

The saws composing each cutter are firmly clamped between the sleeves and thereby support each other, which makes the work very perfect, and the central or larger saws may be very thin.

What I claim as my invention is—

1. In a box-bottom cutting and tonguing machine, the combination, with the endless carrier, of a series of cutters secured at distances apart upon an arbor, the outer cutters of the series consisting of two saws of different diameters, one adapted to cut through and the other to tongue the work, and the inner cutters consisting of three saws, the central one of larger diameter being adapted to cut through the work and the two others on either side thereof being of like diameter but smaller than the central saw and adapted to form a tongue in the work, substantially as described.

2. In a box-bottom cutting and tonguing machine, the combination, with the endless carrier, of a series of revolving cutters secured upon a common arbor at equal distances apart, each cutter being formed of saws clamped together by spacing-sleeves between the cutters, two of the cutters comprising one saw of larger diameter and one saw of smaller diameter and the remaining cutters comprising one central saw and two side saws of equal diameter but smaller than the central saw for simultaneously dividing a board of veneer into lengths of box-bottoms and grooving the ends of each bottom, substantially as described.

3. In a tonguing and cutting machine, the combination, with the frame and a series of revolving cutters secured on a common arbor journaled in the frame, of grooved cross-bars arranged in rear and front of the cutters, laterally-adjustable blocks on the cross-bars, headed bolts passing through the blocks and engaging in the grooves of the bars, a series of longitudinal presser-bars below the cross-bars, vertically-adjustable rods on the blocks on which the presser-bars are mounted, springs interposed between the presser-bars and blocks, and a movable feed-table, substantially as described.

4. In a box-bottom cutting and tonguing machine, the combination of the series of revolving cutters secured upon a common arbor, the pressure-bars E, extending in front and rear of the cutters, the cross-bars D, from which said pressure-bars are suspended, the endless carrier K, provided at intervals with the feed-table M, adapted to carry the work, the shaft $Q^3$, carrying the friction-wheel R, the intermediate gearing to transmit motion from said shaft to the carrier, the friction-wheel S on the counter-shaft S', the sliding box T', in which said shaft is journaled, the spring-cushion T, and the foot-lever $T^2$ and its connection with the said sliding box, all arranged to operate substantially as described.

In testimony whereof I affix my signature in presence of two witnesses.

CHARLES H. FUCHS.

Witnesses:
N. L. BREWER,
H. D. MILLER.